Feb. 5, 1963   E. J. HANKES   3,076,333
LOAD GAUGING APPARATUS
Filed Nov. 5, 1959
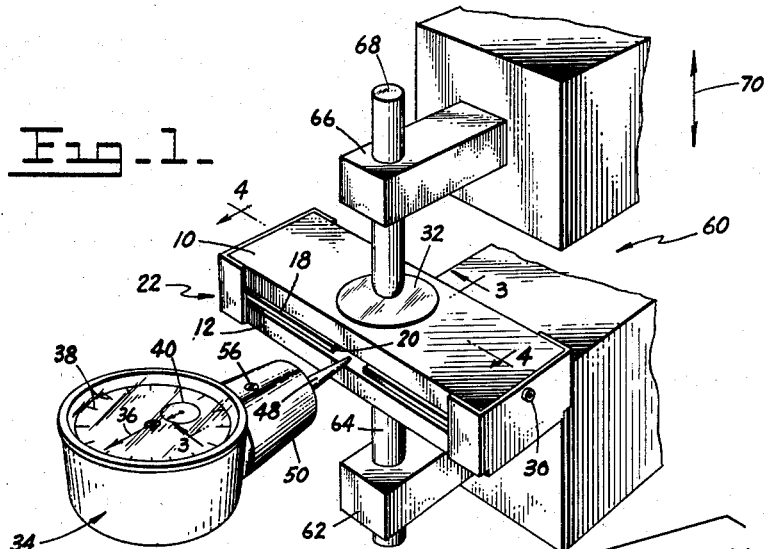
Fig. 1
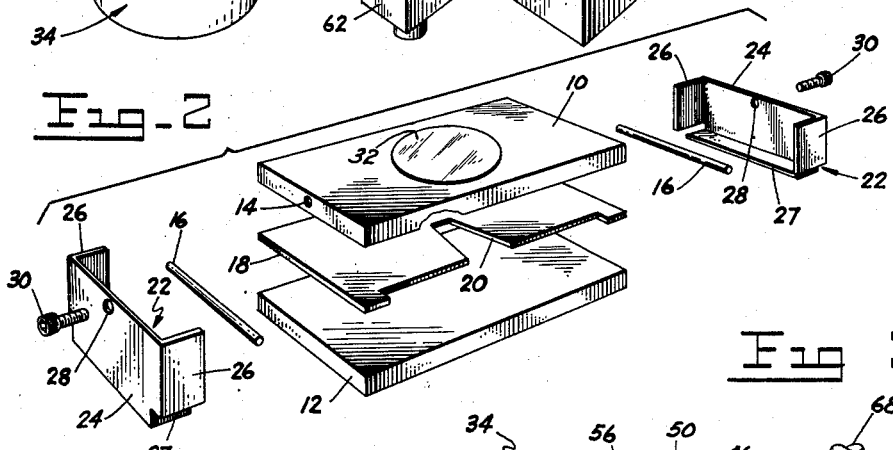
Fig. 2
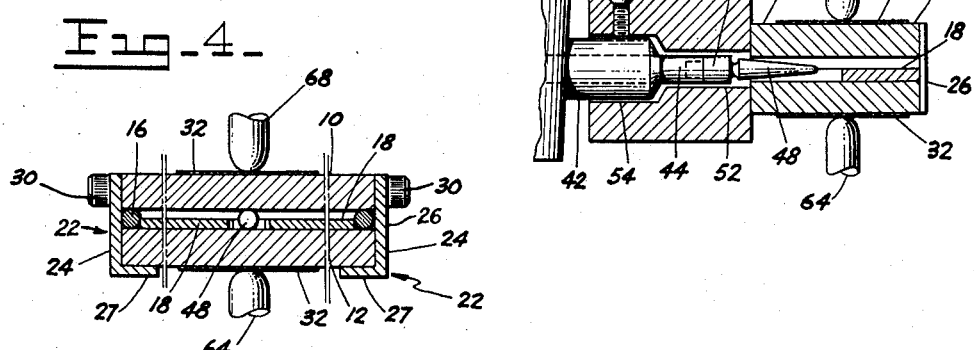
Fig. 3
Fig. 4
INVENTOR.
ELMER J. HANKES
BY
Stuart R. Peterson
ATTORNEY

United States Patent Office 3,076,333
Patented Feb. 5, 1963

3,076,333
LOAD GAUGING APPARATUS
Elmer J. Hankes, 1554 Nicollet Ave., Minneapolis, Minn.
Filed Nov. 5, 1959, Ser. No. 851,104
4 Claims. (Cl. 73—141)

This invention relates generally to force measuring instruments, and pertains more particularly to a load gauge capable of indicating the degree of compressional force exerted between two relatively moveable members.

There are a number of situations where it is desirable or expedient to measure the amount of force being applied to a given object or objects. One such instance is in the spot welding art. Three basic factors govern the production of good spot welds. These factors are: (1) current, (2) pressure, and (3) time. Pressure is one of the most poorly regulated of the three variables, even though it is vitally important in producing consistent spot welds. For instance, insufficient pressure will result in weak welds, expulsion, surface burning, and other defects, while too much pressure will result in indentation and insufficient welding heat because of the lowered contact resistance. Various reasons exist for the realization of improper working pressures. In this regard, the instruments associated with the welding equipment may be of a poor design to begin with, or they may have become inaccurate through lack of proper maintenance. On the other hand, the instruments may be so located that considerable friction and/or inertia may be present between the instruments and the electrode tips. Consequently, it is believed evident that some form of gauging apparatus is necessary in this particular art so that the proper amount of welding pressures may be applied to the work pieces. While the spot welding art has been specifically alluded to, nonetheless other fields exist in which the present invention will find especial utility. For example, in the material handling art where objects are to be gripped in order that they might be manipulated into various preferred positions. Another such field in which the invention may be used is in conjunction with presses of various descriptions. Still further, there are numerous clamping devices in which some indication of the gripping force is highly desirable. Many other specific instances prevail where loads are aplied and the magnitude thereof should be indicated.

Accordingly, one object of the present invention is to provide inexpensive gauging apparatus that can be quickly employed in the ascertainment of applied loads in which one member is movable with respect to another. In consonance with this objective is the fact that an ordinary dial indicator can be used in reading the amount of force being applied. Such indicators are found in most fabricating plants and machine shops and their use is readily understood.

Another object is to provide apparatus of the foregoing character that is exceedingly compact for the loads to which the apparatus will be subjected and therefore renders the apparatus particularly useful in relatively inaccessible places.

A further object of the invention is to provide lightweight apparatus for measuring applied loads and at the same time to provide apparatus that is exceedingly rugged and not apt to get out of order easily.

Still further, an object of the invention is to provide apparatus of the envisaged type that will be quite accurate in use.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing:

FIGURE 1 is a perspective view illustrating my load gauging apparatus in use with spot welding equipment which has been only fragmentarily shown;

FIGURE 2 is another perspective view but shows certain portions of the apparatus in an exploded relationship;

FIGURE 3 is a sectional view taken generally in the direction of line 3—3 of FIGURE 1, and FIGURE 4 is a sectional view taken in the direction of line 4—4 of FIGURE 1.

Referring now in detail to the load gauging apparatus set forth in the drawing which exemplifies the instant invention, it will be observed that such apparatus includes a pair of relatively deflectable rectangular blocks 10 and 12. The particular composition of these blocks will depend upon the loads that they are to withstand. Generally speaking, however, spring steel will serve quite well and in this connection it is contemplated that either chromium-vanadium or silicon-manganese steels be employed, although plain carbon steel will suffice in many instances. For a purpose that will become more readily apparent as the description progresses, a threaded aperture 14 is provided in the upper block 10 at each end thereof.

The blocks 10 and 12 are spaced a predetermined distance apart by means of a pair of cylindrical bars 16, there being one at each end of the plates 10, 12. Interposed between the blocks 10, 12 and the bars 16 is an intermediate plate labeled 18, this plate having a notch 20 extending inwardly from one side edge thereof. As best seen from FIGURES 3 and 4 the plate 18 has a thickness that is somewhat less than the distance between the blocks 10 and 12. Consequently the plate 18 offers no interference with the deflection of the blocks 10, 12 toward each other. In order to hold the foregoing parts in an assembled relationship a pair of U-shaped retaining members 22 are utilized. These U-shaped retaining members include a transverse strip portion 24, inturned leg portions 26, and a flange portion 27. Also included in each retaining member 22 is an aperture 28 which is registrable with the threaded apertures 14 in the upper block 10. When the apertures 14 and 28 are properly aligned a pair of screws 30 can be used to retain the members 22 in place. Thus, when the members 22 are attached to the upper block 10 the leg portions 26 straddle the sides of both blocks 10, 12, and at the same time the flange portions 27 underlie the bottom of the lower block 12. Through the agency of these retaining members 22 it will be understood that the bars 16 as well as the plate 18 are all held captive between the two blocks 10 and 12.

When it is expected that the apparatus will be used around electrical equipment, it is highly desirable that suitable electrical insulation be provided so that possible short circuits be prevented should the electrical equipment be inadvertently energized. In accordance with this particular safeguard, the upper and lower blocks 10 and 12 can each have a disc 32 of pressure sensitive tape applied thereto.

The gauging apparatus herein described makes use of an ordinary dial indicator designated generally by the reference numeral 34. As is conventional with such indicators, a sweep hand 36 cooperates with a plurality of peripherally distributed divisions 38. These divisions 38 represent increments of 0.005 inch. Ordinarily such divisions 38 are subdivided in 0.001 inch increments. One complete revoltuion of the hand 36 might well represent a reading of 0.100 inch. Dial indicators are available in which an additional hand 40 is made available for indicating the number of revolutions made by the hand 36. It will be understood, also, that the dial face on which the divisions 38 appear is usually rotatable with respect to the hand 36, it being possible in this way to set the indicator 34 initially to a zero reading.

The dial indicator 34 is provided with a projecting tubular boss 42 for accommodating a reciprocal plunger 44. The plunger 44 is of course responsible for actuating the hand 36.

While not conventional with the dial indicator 34, nonetheless the instant invention provides for the mounting of a head 46 to the end of the plunger 44. Such mounting can be made by means of a threaded shank or other suitable connection. The important thing to note at this particular time, and this is best understood from an inspection of FIGURE 3, is that the head 6 is formed with a tapered end 48. From FIGURE 3 it can be easily seen that the tapered end 48 is designed to be inserted between the blocks 10, 12 and in the region defined by the notch 20 in the intermediate plate 18.

Another part that that is to be added to the dial indicator 34 in the practicing of the invention as herein illustrated is collar 50 having a bore 52 for the reciprocal accommodation of the plunger 44 and a counterbore 54 for the reception of the tubular boss 42. The collar 50 is held fast on the boss 42 through the agency of a set screw 56. The free end of the collar 50 is designed to abut against the side edges of the blocks 10, 12 as best seen in FIGURE 3.

Inasmuch as the invention will find particular utility in conjunction with spot welding equipment, the apparatus has been shown in association with typical spot welding equipment 60 which is only fragmentarily pictured in FIGURE 1. This equipment, as illustrated, includes a lower horn or arm 62 and an upper horn 66. These horns, as is conventional, serve as holders for a pair of copper electrodes 64 and 68. The lower electrode 64 may be considered to be fixed and the upper electrode 68 movable as indicated by the arrow 70. Having in mind the construction and arrangement of the elements above described, it is believed that the use of my apparatus will be readily understood. However, a brief description of how the apparatus is intended to be used can serve as a review of what has been set forth. For the sake of discussion we will assume that the divisions 38 represent fifty pound increments. In other words the 0.001 inch subdivisions would each represent ten pounds. Under this set of assumed circumstances, a full revolution of the hand 36 would signify a total loading of one thousand pounds. Of course the specific figures herein mentioned are susceptible to rather wide modification. In this regard it will of course be appreciated that the spacing of the blocks 10, 12, coupled with the taper imparted to the end 48, plus the particular composition of the blocks 10, 12 will all influence the particular reading derived with the dial indicator 34. Quite obviously, the divisions on the dial indicator might be varied also.

Nonetheless, a typical use will now be presented. As shown in FIGURE 1, the tapered end 48 is in a proximal relationship with the spacing between the blocks 10, 12. Upon further movement of the dial indicator 34 which is intended in most instances to be held in one's hand, the tapered end 48 will extend inwardly into the notch 20 of the plate 18 and can be moved sufficiently until the end 48 abuts the sides of the blocks 10, 12. To establish a starting point, the dial indicator 34 can be pressed still farther in the direction of the blocks 10, 12 and this will cause the collar 50 to abut the sides of said blocks as shown in FIGURE 3. No load is at this time being applied to the electrodes 64 and 68. Hence, there is no deflection of the rectangular blocks 10, 12. Accordingly, the tapered end 48 of the head 46 extends a relatively large distance into the region between said blocks 10, 12.

After reading the position of the hand 36, or after having rotated the dial with the divisions 38 thereon so as to bring into alignment the zero division 38, the dial indicator 34 is withdrawn. Then, load is applied and the procedure is repeated. This time the tapered end 48 will not extend as far into the region between the blocks 10, 12 for these two blocks will now be deflected by virtue of the applied load. Because of this state of affairs the dial indicator 34 will provide a different reading when the collar 50 is abutted against the sides of the blocks 10, 12. It is this difference in the two readings, that is between the initial reading and the second reading, that is determinative of the load conditions existing at the blocks 10, 12. This subsequent reading will then permit facile determination of the load that is causing the deflection and the resulting decrease in the distance or spacing between the blocks 10, 12 at their center.

With the pressure sensitive sections 32 on either or both of the blocks 10, 12, it will be appreciated that even if the welding equipment 60 is inadvertently energized that no current will pass through the blocks 10, 12. This is purely a precautionary measure that should be taken, as hereinbefore already mentioned, when the gauging apparatus is intended to be used in conjunction with electrical equipment.

Although it is believed readily apparent, nonetheless attention is drawn to the fact that the intermediate plate 18 does not occupy the full distance existing between the blocks 10, 12. However, the thickness of the plate 18 may be selected so that it serves as a safeguard to prevent overloading the blocks 10, 12. It will be of benefit to select a thickness that will prevent the blocks 10, 12 from reaching their elastic limit where permanent deformation would occur. Also, it will be noted that the plate 18 serves to keep the cylindrical bars 16 in their proper location adjacent each end of the apparatus. Of course the retaining members 22 act to keep the bars 16 from moving outwardly.

As many changes could be made in the above construction and many apparently widely different embodiments of the invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. Load gauging apparatus of the class described comprising a pair of oppositely disposed and relatively deflectable rectangular blocks, a cylindrical bar interposed between each of the ends of said blocks for spacing said ends a predetermined distance apart, means maintaining said bars in a spaced relationship with each other, and means retaining said blocks in a fixed relationship relative to each other to maintain the spacing provided by said cylindrical bars, said bar maintaining means comprising an element positioned between said blocks having a lesser thickness than the spacing provided by said cylindrical bars and including guide means for a tapered measuring tool so that the deflection of said blocks will always be measured at the same location intermediate their ends.

2. Load gauging apparatus of the class described comprising a pair of oppositely disposed and relatively deflectable rectangular blocks, one of which blocks has an inwardly directed threaded aperture at each end, a cylindrical bar interposed between the ends of said blocks for spacing said ends a predetermined distance apart, a plate element disposed intermediate said blocks and said bars, said plate element having a lesser thickness than the distance between said blocks and having a notch extending inwardly from one side edge thereof, a pair of U-shaped retaining members each having a strip portion abutting the opposite ends of said blocks with inturned leg portions embracing the sides of said blocks and a flange portion underlying the bottom of the other block, said strip portions each having an aperture in registry with the block apertures, screw elements extending through said strip apertures into said block apertures whereby the U-shaped retaining members are attached to said one block and said leg and flange portions hold the other block in assembled relation with said one block with said bars and plate being held captive between said blocks, a dial indicator equipped with a reciprocal plunger, said plunger having a tapered end insertable into said notch intermediate said blocks, and a collar affixed to said dial indicator for engaging the side edges of said blocks to establish a predetermined location of said dial indicator with respect to said blocks, whereby the difference between an initial reading of said dial indicator with no load applied to said blocks and a second reading with load applied to said blocks will be indicative of the magnitude of said applied load.

3. Load gauging apparatus of the class described comprising a pair of oppositely disposed and relatively deflectable rectangular blocks, means maintaining the ends of said blocks a fixed distance apart, a plate disposed between said blocks having a thickness less than said fixed distance, said plate having a centrally disposed notch extending inwardly from one edge, a tapered member insertable into said notch having a thickness less than said fixed distance at its free end and a thickness greater than said fixed distance nearer its other end, and means for determining the difference in the degree of insertion of said tapered member into said notch between an undeflected condition of the blocks and a deflected condition of said blocks to provide an indication of the load applied to said blocks to cause said deflected condition.

4. Load gauging apparatus of the class described comprising a pair of oppositely disposed and relatively deflectable rectangular blocks having flat opposed surfaces, a pair of cylindrical members interposed between said flat surfaces at the ends of said blocks for spacing said ends a fixed distance apart, a pair of retaining members attached to the opposite ends of one of said blocks, each of said retaining members extending across the opening existing at its end into engagement with the other of said blocks, said retaining members holding the flat surfaces of said blocks in contact with said cylindrical members and also preventing escape of said cylindrical members outwardly from the ends of said blocks, and plate means disposed between said blocks and between said cylindrical members having a thickness less than said fixed distance, said plate means having a length sufficient to prevent said cylindrical members from moving toward each other and also having a centrally disposed notch extending inwardly from one edge, a tapered member insertable into said notch having a thickness less than said fixed distance at its free end and a thickness greater than said fixed distance nearer its other end, and means for determining the difference in the degree of insertion of said tapered member into said notch between an undeflected condition of the blocks and a deflected condition of said blocks to provide an indication of the load applied to said blocks to cause said deflected condition.

References Cited in the file of this patent

UNITED STATES PATENTS

| | | |
|---|---|---|
| 2,844,881 | Stunkel | July 29, 1958 |
| 2,888,751 | Pedrick | June 2, 1959 |

FOREIGN PATENTS

| | | |
|---|---|---|
| 445,345 | Germany | Nov. 28, 1925 |

OTHER REFERENCES

Article entitled, "An Adjustable-Range Force-Measuring Spring," from The Iron Age, September 20, 1945, page 63, classified 73-141.

Article entitled, "A Gauge for Measuring Compression Force," by P. H. Rinkel, from vol. 24 of Journal of Scientific Instruments, November 1947, pages 298 and 299, classified 73-141.